(12) United States Patent
Turner et al.

(10) Patent No.: US 6,514,169 B2
(45) Date of Patent: Feb. 4, 2003

(54) TANDEM AXLE ASSEMBLY WITH DIFFERENT HYPOID OFFSETS

(75) Inventors: Gary A. Turner, Three Rivers, MI (US); Leo Wenstrup, Portage, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/865,412

(22) Filed: May 25, 2001

(65) Prior Publication Data

US 2002/0177501 A1 Nov. 28, 2002

(51) Int. Cl.$^7$ ............................................... F16H 48/08
(52) U.S. Cl. ........................................ 475/222; 475/230
(58) Field of Search ................................ 475/230, 221, 475/222; 74/424; 180/24.09, 24.11

(56) References Cited

U.S. PATENT DOCUMENTS

| | | | |
|---|---|---|---|
| 1,992,365 A | 2/1935 | Fageol | 180/22 |
| 2,477,925 A | 8/1949 | Gentry | 180/22 |
| 2,870,853 A | 1/1959 | Keese | 180/22 |
| 2,870,854 A | 1/1959 | Keese | 180/22 |
| 3,213,700 A * | 10/1965 | Brownyer | 74/424 |
| 3,310,999 A * | 3/1967 | Griffith | 475/246 |
| 3,318,173 A * | 5/1967 | Puidokas | 475/246 |
| 3,324,965 A | 6/1967 | Koch et al. | |
| 3,706,350 A | 12/1972 | Bokovoy | 180/24.09 |
| 3,749,196 A | 7/1973 | Traylor | 180/85 |
| 3,976,154 A * | 8/1976 | Clark et al. | 180/24.09 |
| 4,194,586 A * | 3/1980 | Hicks | 180/24.09 |
| 4,651,587 A * | 3/1987 | Anderson et al. | 475/230 |
| 6,093,127 A * | 7/2000 | DiDomenico et al. | 475/230 |
| 6,364,803 B1 * | 4/2002 | Barnholt et al. | 475/230 |

FOREIGN PATENT DOCUMENTS

| | | | | |
|---|---|---|---|---|
| GB | 2029521 | * | 3/1980 | 180/24.11 |
| JP | 10071869 | | 3/1998 | |

* cited by examiner

*Primary Examiner*—Sherry Estremsky
*Assistant Examiner*—Ha Ho
(74) *Attorney, Agent, or Firm*—Dykema Gossett PLLC

(57) ABSTRACT

A tandem axle assembly is provided. The tandem axle assembly includes a forward axle assembly and a rear axle assembly and an intermediate drive shaft assembly extending between the two axle assemblies. The forward and rear axle assemblies both include a pinion gear rotating responsive to an inter-axle differential and a ring gear in mesh with the pinion gear. The forward pinion gear is offset from the forward ring gear by a first predetermine distance while the rear pinion gear is offset from the rear ring ear by a second predetermined distance. The second predetermined distance is greater than zero, but is less than the first predetermined distance. The variation in offsets enables both equal working angles in the intermediate drive shaft assembly and a reduction in those angles as compared to conventional tandem axle assemblies. Further, the variation in offset results in stronger and quieter gearing.

15 Claims, 3 Drawing Sheets

TANDEM AXLE ASSEMBLY WITH DIFFERENT HYPOID OFFSETS

BACKGROUND OF THE INVENTION

1. Field of the Invention

This invention relates to tandem axle assemblies and, in particular, to an arrangement of gears within a tandem axle assembly.

2. Disclosure of Related Art

A conventional tandem axle assembly includes forward and rear axle assemblies and an intermediate drive shaft assembly connecting the two axle assemblies. The forward and rear axle assemblies each include a pair of axle half shafts extending therefrom on which one or more wheels of a vehicle are mounted. Each of the forward and rear axle assemblies further includes a differential gear set that allows the vehicle wheels on each axle assembly to rotate at different speeds. Each of the differential gear sets includes a pinion gear in mesh with a ring gear (which in turn drives a plurality of bevel gears to cause rotation of the axle half shafts). The pinion gears of the forward and rear axle assemblies are driven by an inter-axle differential housed within the forward axle assembly (with the rear axle assembly being driven by the inter-axle differential through the intermediate drive shaft assembly).

In many conventional tandem axle assemblies, the pinion gears and ring gears comprise hypoid gears and the axis of rotation for each pinion gear is offset from the axis of rotation of a corresponding ring gear (i.e., the two axes lie in different parallel planes). This offset improves contact ratio between the pinion gears and ring gears thereby resulting in stronger and quieter gearing. In these conventional tandem axle assemblies, the offset between the pinion gear and ring gear of the forward axle assembly is identical to the offset between the pinion gear and ring gear of the rear axle assembly.

Many of the above-described conventional tandem axle assemblies suffer from a significant drawback. In particular, the intermediate drive shaft assembly includes an output yoke and an input yoke that exit and enter, respectively, the forward and rear axle assemblies at different angles. This difference in working angles results in a "broken back" arrangement for the intermediate drive shaft disposed between the two yokes and subjects the universal joints coupling the intermediate drive shaft to the yokes to relatively large amounts of vibration and torsional stress. In a few prior art tandem axle assemblies, the output yoke and input yoke have the same working angles and, therefore, the intermediate drive shaft has a "parallel" arrangement in which the universal joints are subject to less vibration and torsional stress. Although the working angles are equal, however, the identical gear offsets result in working angles that are relatively large which results in relatively high levels of inertia during acceleration and deceleration of the vehicle.

The assignee of the present invention, Dana Corporation, has produced a tandem drive axle assembly called the DST 40 in which the output yoke and input yoke of the intermediate drive axle assembly exit and enter, respectively, the forward and rear axle assemblies at the same angle. As a result, the intermediate drive shaft has a "parallel" arrangement and the universal joints coupling the intermediate drive shaft to the yokes are not subject to the same degree of vibration and torsional stress. In order to achieve this parallel arrangement without producing large working angles, however, the DST 40 uses a spiral bevel gearset (with no offset between the pinion and ring gears) in the rear axle assembly. Therefore, although the DST 40 represents a significant improvement over conventional tandem axle assemblies by virtue of the parallel arrangement of the intermediate drive shaft, the DST 40 lacks the gear strength and low noise levels found in some prior art tandem axle assemblies.

There is thus a need for a tandem axle assembly that will minimize or eliminate one or more of the above-mentioned deficiencies.

SUMMARY OF THE INVENTION

The present invention provides a tandem axle assembly for a vehicle.

A tandem axle assembly in accordance with the present invention includes a forward axle assembly and a rear axle assembly. The forward axle assembly includes a forward ring gear and a forward pinion gear in mesh with the forward ring gear. The rear axle assembly includes a rear ring gear and a rear pinion gear in mesh with the rear ring gear. The forward and rear pinion gears rotate in response to an inter-axle differential. The forward pinion gear is offset from the forward ring gear by a first predetermined distance while the rear pinion gear is offset from the rear ring gear by a second predetermined distance. The second predetermined distance is greater than zero, but is less than the first predetermined distance.

A tandem axle assembly in accordance with the present invention has several advantages as compared to conventional tandem axle assemblies. The variation in offsets between the gears in the forward and rear axle assemblies of the tandem axle assembly produces working angles that are both equal and relatively small. The equal working angles enable a parallel arrangement for the intermediate drive shaft assembly thereby reducing vibration and torsional stress at the universal joints on either end of the drive shaft assembly. The small working angles reduce inertia during acceleration and deceleration of the vehicle. Finally, the use of an offset gear arrangement in both the forward and rear axle assemblies results in increased gear contact ratio in both assemblies thereby producing stronger and quieter gearing.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
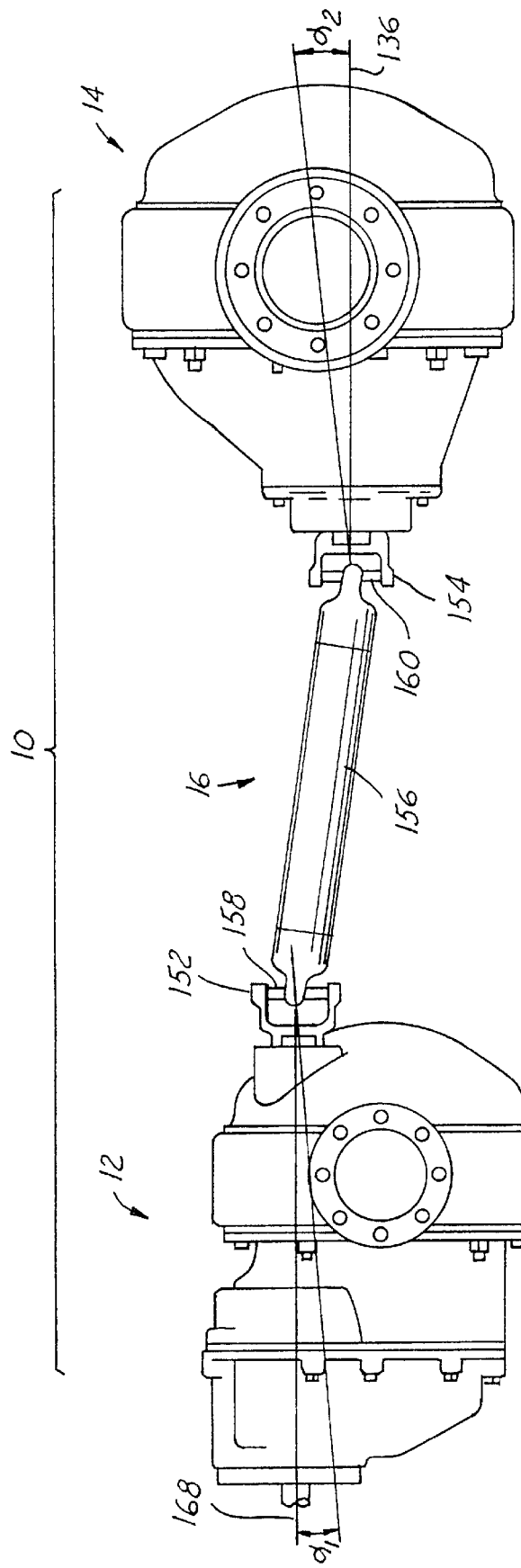
FIG. 1 is a side view of a tandem axle assembly in accordance with the present invention.

Referring now to the drawings wherein like reference numerals are used to identify identical components in the various views, FIG. 1 illustrates a tandem axle assembly 10 in accordance with the present invention. Axle assembly 10 is provided to support the frame (not shown) of a vehicle on a plurality of wheels (not shown). Assembly 10 is particularly adapted for use in heavy trucks. It should be understood, however, that the present invention is not limited to use in heavy trucks and may be used in a wide variety of vehicles. Assembly 10 includes a forward axle assembly 12, a rear axle assembly 14 and an intermediate drive shaft assembly 16.

Figure 2:
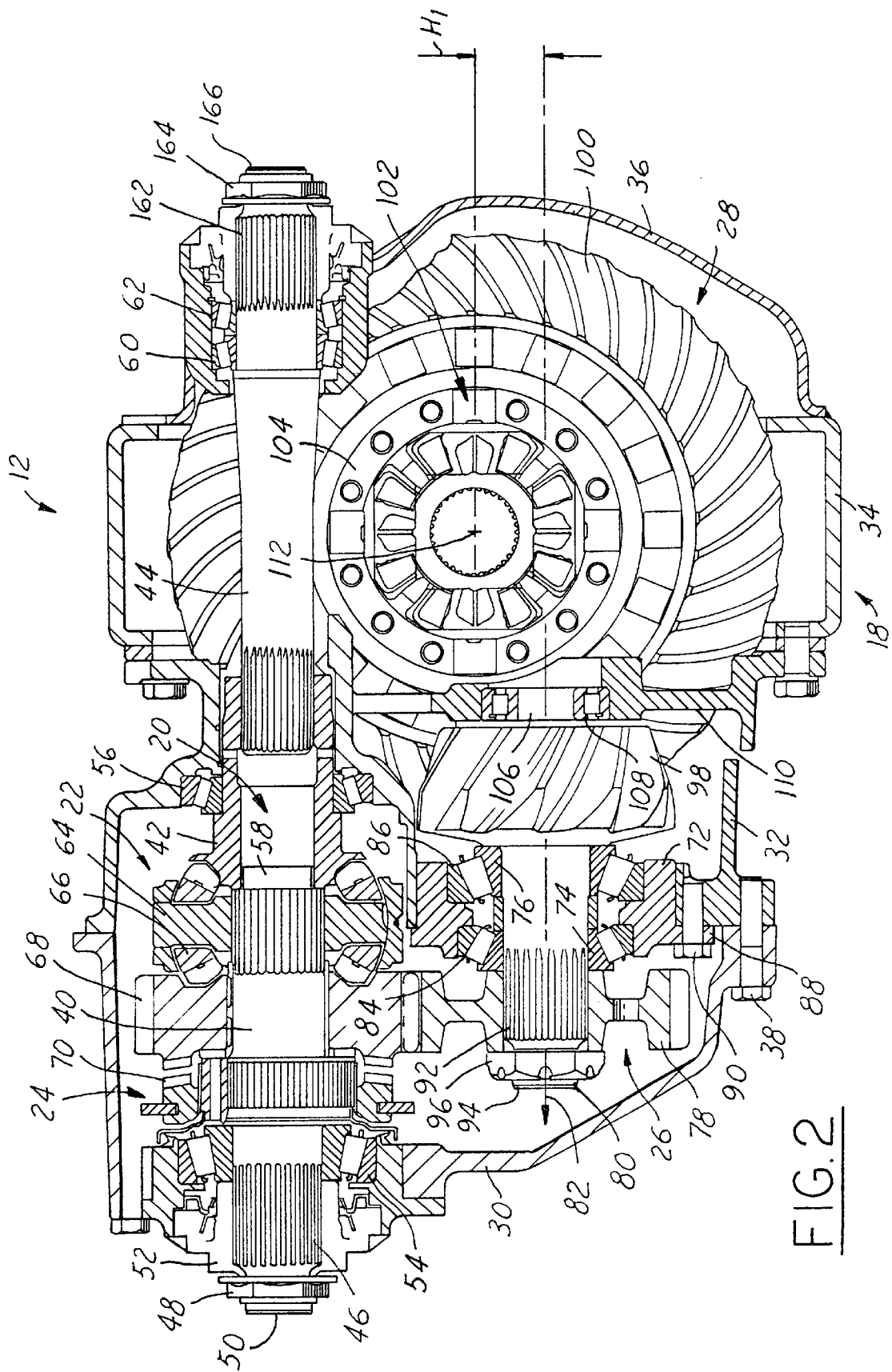
FIG. 2 is a cross-sectional view of the forward axle assembly of the tandem axle assembly of FIG. 1.

Forward axle assembly 12 is provided to drive wheels (not shown) supported on either side of assembly 12 on axle half shafts (not shown) extending from axle assembly 12. Referring to FIG. 2, assembly 12 may include a housing 18, a drive shaft assembly 20, means, such as an inter-axle differential 22, for dividing power between assembly 12 and assembly 14, a differential locking device, such as clutch 24, a pinion shaft assembly 26, and a differential gear assembly 28.

Housing 18 provides structural support for the other components of assembly 12. Housing 18 also protects the other components of assembly 12 from foreign objects and elements. Housing 18 may be made from conventional metals and metal alloys such as steel and may include multiple members 30, 32, 34, 36 that are sized relative to components of assembly 12 and coupled together using conventional fasteners 38.

Drive shaft assembly 20 is provided to transmit power from a power input shaft (not shown) at the forward end of drive axle assembly 12 to intermediate drive shaft assembly 16. Drive shaft assembly 20 is conventional in the art and may include an input shaft 40, a gear 42, and an output shaft 44.

Input shaft 40 is provided to transmit power from the power input shaft (not shown) to inter-axle differential 22 and is conventional in the art. Input shaft 40 is driven by the power input shaft through a conventional input yoke (not shown). The input yoke may be splined to the forward end of input shaft 40 on splines 46 and may be retained thereon by a nut 48 and a washer which are disposed about a threaded stud 50 that extends from the forward end of shaft 40 and is integral therewith. A cap 52 is disposed about the input yoke and is received within an opening in housing member 30. Shaft 40 is journalled for rotation within an opening in cap 52 by bearings 54 disposed within the opening.

Gear 42 transmits power received from inter-axle differential 22 to output shaft 44. Gear 42 is conventional in the art and may be made from conventional metals and metal alloys. Gear 42 is disposed about shaft 44 near the forward end of shaft 44 and may be coupled thereto by mating splines (not shown) on gear 42 and shaft 44. Gear 42 is journalled for rotation within housing member 32 by bearings 56.

Output shaft 44 is provided to transmit a portion of the power provided by input shaft 40 to the intermediate drive shaft assembly 16. Shaft 44 is coaxially disposed relative to input shaft 40 and includes a pilot portion 58 at its forward end on which input shaft 40 is journalled. Shaft 44 extends through openings in housing members 32, 34, 36, respectively, and is journalled within an opening of housing member 36 by bearings 60, 62.

Inter-axle differential 22 is provided to divide power between assemblies 12, 14 and is conventional in the art. Differential 22 may include a spider 64, bevel gears 66, and an input gear 68.

Spider 64 provides a mounting arrangement for bevel gears 66 and is conventional in the art. Spider 64 may be coupled to input shaft 40 for rotation therewith using a spline connection or in other ways customary in the art. Alternatively, spider 64 may be made integral with input shaft 40.

Bevel gears 66 are provided to divide and transfer torque from input shaft 40 to input gear 68 and to gear 42 of drive shaft assembly 20. Gears 66 are conventional in the art and may be made from conventional metals and metal alloys. Gears 66 are mounted on spider 64 for rotation with spider 64 and input shaft 40. The teeth on gears 66 engage corresponding teeth on gear 42 of drive shaft assembly 20 and on input gear 68.

Input gear 68 transfers torque from inter-axle differential 20 to pinion shaft assembly 26. Gear 68 is also conventional in the art and may be made from conventional metals and metal alloys. Gear 68 is disposed about input shaft 40 and is freely rotatable thereon, being journalled on shaft 40 by bearings (not shown). Gear 68 includes a first set of teeth on a forward planar surface which form a first member of clutch 24 and a second set of teeth disposed on a rear planar surface that engage the teeth of bevel gears 66. Gear 68 further includes a third set of teeth disposed about the radial periphery of gear 68 for a purpose described hereinbelow.

Clutch 24 is provided to selectively lock differential 22 and is conventional in the art. In the illustrated embodiment, clutch 24 comprises a conventional sliding dog clutch that may be engaged by shifting a clutch member 70 with a first set of teeth into engagement with a clutch member (gear 68 in the illustrated embodiment) having a second set of teeth using a shifting fork.

Pinion shaft assembly 26 transfers torque from drive shaft assembly 20 to differential gear assembly 28. Assembly 26 may include a bearing cage 72, bearings 74, 76, a driven gear 78, and a pinion shaft 80.

Bearing cage 72 provides structural support and positions other components of assembly 26. Cage 72 may be made from conventional metals and metal alloys and is disposed about an axis 82 extending through pinion shaft 80. Cage 72 defines axially aligned openings 84, 86 configured to receive bearings 74, 76. Cage 72 also defines a mounting flange 88 through which cage 72 may be coupled to housing member 32 using one or more conventional fasteners 90 such as screws or bolts.

Bearings 74, 76 enable rotation of pinion shaft 80 relative to bearing cage 72. Bearings 74, 76 are conventional in the art and may comprise tapered roller bearings. Bearings 74, 76 are disposed within openings 84, 86 of cage 72 and are disposed about axis 82.

Driven gear 78 transmits torque from input gear 68 of inter-axle differential 22 to pinion shaft 80. Driven gear 78 may comprise a helical gear having teeth disposed about its radial periphery which engage corresponding teeth on input gear 68. Gear 78 may be drivingly coupled to shaft 80 through axially-extending splines 92 on shaft 80.

Pinion shaft 80 transmits torque to differential gear assembly 28 and is conventional in the art. Shaft 80 is disposed about axis 82 and is supported for rotation within openings 84, 86 of cage 72 by bearings 74, 76. A forward axial end of shaft 80 may define an integral threaded stud 94 configured to receive a nut 96 used to retain gear 78 on shaft 80.

Differential gear assembly 28 is provided to allow the wheels supported on either side of axle assembly 12 to rotate at different speeds. Assembly 28 may include a pinion gear 98, a ring gear 100, and a conventional bevel gear set 102 disposed within a if differential carrier 104.

Pinion gear 98 is provided to transfer torque from pinion shaft 80 to ring gear 100. Pinion gear 98 may be made from conventional metals and metal alloys and may comprise a hypoid gear.

Gear 98 rotates about axis 82. Gear 98 is disposed about shaft 80 and may be mounted thereto using a conventional spline connection or in other ways customary in the art. Gear 98 may also include a pilot portion 106 extending rearwardly that is supported for rotation by bearings 108 disposed in a pilot web 110 of housing member 32.

Ring gear 100 is provided to transfer torque from pinion gear 98 to bevel gear set 102 and is conventional in the art. Ring gear 100 may also be made from conventional metals and metal alloys and may also comprise a hypoid gear. Gear 100 is affixed to carrier 104 or may be integral therewith. Gear 100 is disposed about an axis 112 of rotation. In accordance with the present invention, axis 112 is offset from the axis 82 of rotation of pinion gear 98 by a predetermined distance H1 (i.e., the two axes 82, 112 lie in different horizontal planes). Although the distance H1 may be varied without departing from the scope of the present invention, the distance in several tested embodiments ranged between about 31 mm and about 46 mm. In one embodiment, the distance was about 46 mm.

Bevel gear set 102 is provided to transfer torque from ring gear 100 to the axle half shafts supporting the vehicle wheels. Gear 102 set is conventional in the art.

Figure 3:
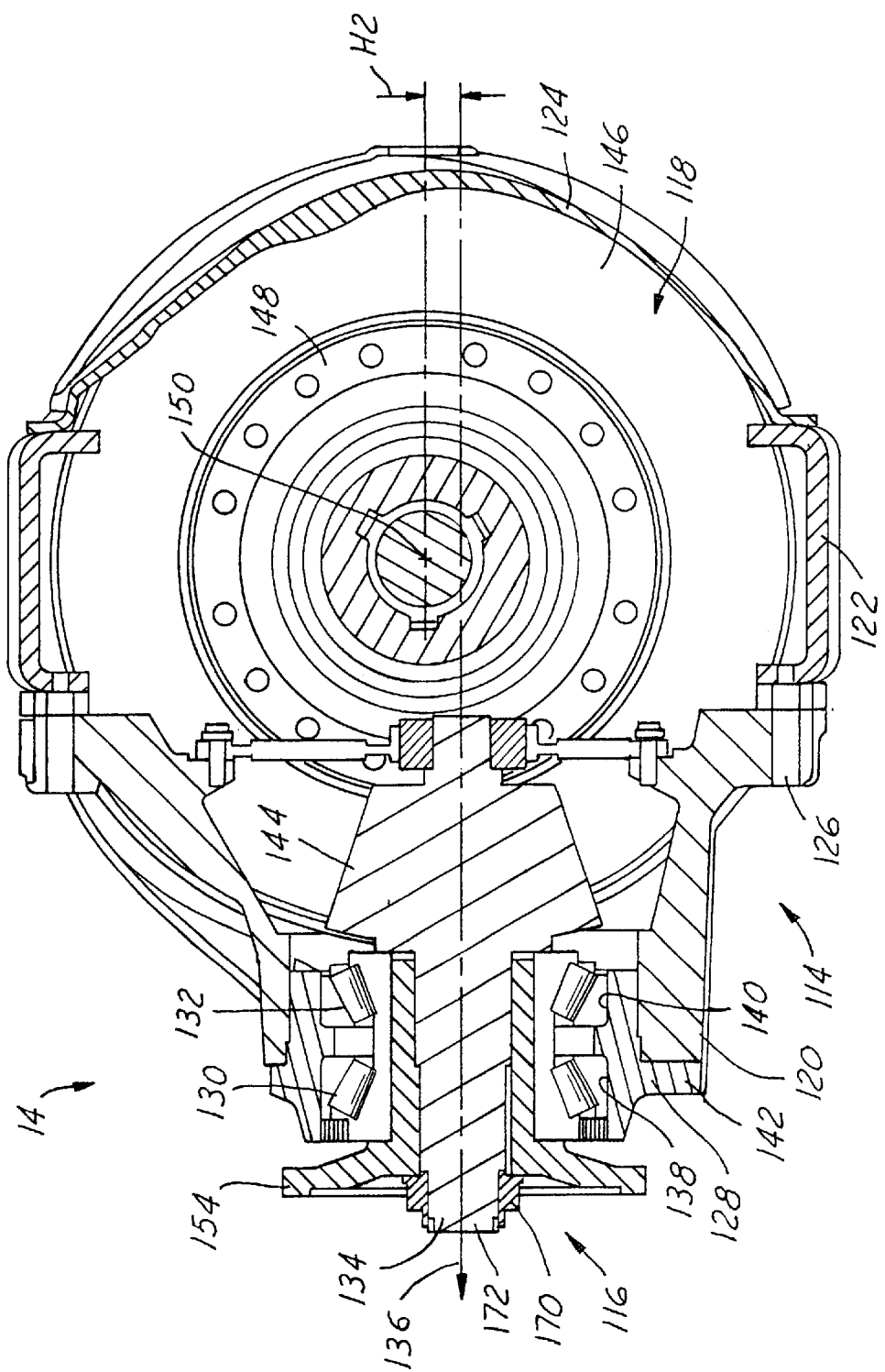
FIG. 3 is a cross-sectional view of the rear axle assembly of the tandem axle assembly of FIG. 1.

Referring now to FIG. 3, rear axle assembly 14 will be described in greater detail. Rear axle assembly 14 is provided to drive wheels (not shown) supported on either side of assembly 14 on axle half shafts (not shown) extending from axle assembly 14. Assembly 14 may include a housing 114, a pinion shaft assembly 116 and a differential gear assembly 118.

Housing 114 provides structural support for the other components of assembly 14. Housing 114 also protects the other components of assembly 14 from foreign objects and elements. Housing 114 may be made from conventional metals and metal alloys such as steel and may include multiple members 120, 122, 124 that are sized relative to components of assembly 14 and coupled together using conventional fasteners 126 during assembly of assembly 14.

Pinion shaft assembly 116 is provided to transfer torque from intermediate drive shaft assembly 16 to differential gear assembly 118. Shaft assembly 116 may include a bearing cage 128, bearings 130, 132, and a pinion shaft 134.

Bearing cage 128 provides structural support and positions other components of assembly 14. Cage 128 may be made from conventional metals and metal alloys and is disposed about an axis 136 extending through pinion shaft 134. Cage 128 defines axially aligned openings 138, 140 configured to receive bearings 130, 132. Cage 128 also defines a mounting flange 142 through which cage 128 may be coupled to housing member using one or more conventional fasteners (not shown) such as screws or bolts.

Bearings 130, 132 enable rotation of pinion shaft 134 relative to bearing cage 128. Bearings 130, 132 are conventional in the art and may comprise tapered roller bearings. Bearings 130, 132 are disposed within openings 138, 140 of cage 128.

Pinion shaft 134 transmits torque to differential gear assembly 118 and is conventional in the art. Shaft 134 is disposed about axis 136 and is supported for rotation within openings 138, 140 of cage 128 by bearings 130, 132.

Differential gear assembly 118 is provided to allow the wheels supported on either side of axle assembly 14 to rotate at different speeds. Like assembly 28 in forward axle assembly 12, assembly 118 may include a pinion gear 144, a ring gear 146, and a conventional bevel gear set (not shown) disposed within a differential carrier 148.

Pinion gear 144 is provided to transfer torque from intermediate drive shaft assembly 16 to ring gear 146. Pinion gear 144 may be made from conventional metals and metal alloys and may comprise a hypoid gear. Gear 144 rotates about axis 136. Gear 144 is disposed about shaft 134 and may be integral therewith as shown in the illustrated embodiment or may be mounted thereto using a conventional spline connection or in other ways customary in the art.

Ring gear 146 is provided to transfer torque from pinion gear 144 to the bevel gear set and is conventional in the art. Ring gear 146 may also be made from conventional metals and metal alloys and may also comprise a hypoid gear. Gear 146 is affixed to carrier 146 or may be integral therewith. Gear 146 is disposed about an axis 150 of rotation. In accordance with the present invention, axis 150 is offset from the axis 136 of rotation of pinion gear 144 by a predetermined distance H2 (i.e., the two axes 136, 150 lie in differential horizontal planes). Further, axes 136, 150 are offset by a predetermined distance H2 that is greater than zero, but less than the predetermined distance H1 by which axes 82, 112 of gears 98, 100 in forward axle assembly 12 are offset. Although the amount of the offset may be varied without departing from the scope of the present invention, the offset in several tested embodiments ranged between 0 mm and about 25 mm.

Referring again to FIG. 1, intermediate drive shaft assembly 16 will be described in greater detail. Assembly 16 is provided to transfer torque from drive shaft assembly 20 of forward axle assembly 12 to rear axle assembly 14. Assembly 16 may include an output yoke 152 at a forward end, an input yoke 154 at a rear end, an intermediate drive shaft 156 between yokes 152, 154 and conventional universal joints 158, 160 for coupling drive shaft 156 to yokes 152, 154.

Output yoke 152 is provided to transmit power from output shaft 44 (shown in FIG. 2) to intermediate drive shaft 156. Referring to FIG. 2, yoke 152 may be splined to the rear end of output shaft 44 on splines 162 and may be retained thereon by a nut 164 and a washer which are disposed about a threaded stud 166 that extends from shaft 44 and is integral therewith. Referring again to FIG. 1, yoke 152 is coupled to shaft 156 through universal joint 158. Yoke 152 is disposed about an axis 168 of rotation and exits forward axle assembly 12 at a predetermined angle a, relative to a horizontal plane (or ground).

Input yoke 154 is provided to transmit power from intermediate drive shaft 156 to pinion shaft 134 of rear axle assembly 14. Referring to FIG. 3, yoke 154 may be splined to the forward end of pinion shaft 134 on splines and may be retained thereon by a nut 170 and a washer which are disposed about a threaded stud 172 that extends from shaft 134 an is integral therewith. Referring again to FIG. 1, yoke 154 is coupled to shaft 156 through universal joint 160. Yoke 154 is configured to rotate about axis 136 extending through pinion shaft 134 and pinion gear 144 in rear axle assembly 14. Yoke 154 exits rear axle assembly 14 at a predetermined angle $\alpha_2$ relative to a horizontal plane (or ground). In accordance with the present invention, angle $\alpha_1$ is equal to angle $\alpha_2$ and axes 168, 136 are parallel to one another.

Intermediate drive shaft 156 transmits power between yokes 152, 154. Shaft is conventional in the art and is coupled to yokes through universal joints 158, 160.

A tandem axle assembly in accordance with the present invention represents a significant improvement as compared to conventional tandem axle assemblies. The use of varying offsets H1, H2 between the pinion 98, 144 and ring gears 100, 146 in the forward and rear axle assemblies 12, 14 both equalizes the working angles $\alpha_1$, $\alpha_2$ for the intermediate drive shaft assembly 16 and reduces those angles as compared to conventional tandem axle assemblies. By making the working angles $\alpha_1$, $\alpha_2$ equal, the drive shaft assembly may assume a parallel arrangement whereby vibration and torsional stress on the universal joints 158, 160 is reduced and smaller driveline components may be used in the intermediate drive shaft assembly 16. The reduction in working angles $\alpha_1$, $\alpha_2$ further reduces inertia in the drive shaft assembly during acceleration and deceleration of the vehicle. Finally, the above advantages are accomplished while using an offset gear arrangement in the rear axle assembly 14 which results in a stronger and quieter gear arrangement than in the rear axle assembly of Dana Corporation's DST 40.

While the invention has been particularly shown and described with reference to the preferred embodiments thereof, it is well understood by those skilled in the art that various changes and modifications can be made in the invention without departing from the spirit and scope of the invention.

We claim:

1. A tandem drive axle assembly, comprising:
    a forward axle assembly including
        a forward ring gear; and,
        a forward pinion gear in mesh with said forward ring gear, said forward pinion gear rotating in response to an inter-axle differential;
    a rear axle assembly including
        a rear ring gear; and,
        a rear pinion gear in mesh with said rear ring gear, said rear pinion gear rotating in response to said inter-axle differential;
    wherein said forward pinion gear is offset from said forward ring gear by a first predetermined distance and said rear pinion gear is offset from said rear ring gear by a second predetermined distance, said second predetermined distance greater than zero, but less than said first predetermined distance.

2. The tandem axle assembly of claim 1 wherein said forward ring gear, said forward pinion gear, said rear ring gear, and said rear pinion gear comprise hypoid gears.

3. The tandem axle assembly of claim 1 wherein said first predetermined distance is between about thirty-one millimeters and about forty-six millimeters.

4. The tandem axle assembly of claim 3 wherein said first predetermined distance is about forty-six millimeters.

5. The tandem axle assembly of claim 1 wherein said second predetermined distance is between about zero millimeters and about twenty-five millimeters.

6. A tandem drive axle assembly, comprising:
    a forward axle assembly including
        a forward ring gear disposed about a first axis; and,
        a forward pinion gear in mesh with said forward ring gear and disposed about a second axis, said forward pinion gear rotating in response to an inter-axle differential;
    a rear axle assembly including
        a rear ring gear disposed about a third axis; and,
        a rear pinion gear in mesh with said rear ring gear and disposed about a fourth axis, said rear pinion gear rotating in response to said inter-axle differential;
    wherein said first axis is offset from said second axis by a first predetermined distance and said third axis is offset from said fourth axis by a second predetermined distance, said second predetermined distance greater than zero, but less than said first predetermined distance.

7. The tandem axle assembly of claim 6 wherein said forward ring gear, said forward pinion gear, said rear ring gear, and said rear pinion gear comprise hypoid gears.

8. The tandem axle assembly of claim 6 wherein said first predetermined distance is between about thirty-one millimeters and about forty-six millimeters.

9. The tandem axle assembly of claim 8 wherein said first predetermined distance is about forty-six millimeters.

10. The tandem axle assembly of claim 6 wherein said second predetermined distance is between about zero millimeters and about twenty-five millimeters.

11. A tandem drive axle assembly, comprising:
    a forward axle assembly including
        a forward ring gear; and,
        a forward pinion gear in mesh with said forward ring gear, said forward pinion gear rotating in response to an inter-axle differential;
    a rear axle assembly including
        a rear ring gear; and,
        a rear pinion gear in mesh with said rear ring gear, said rear pinion gear rotating in response to said inter-axle differential;
    an intermediate drive shaft assembly extending between said forward axle assembly and said rear axle assembly, said drive shaft assembly including
        an output yoke extending from said forward axle assembly and disposed about a first axis of rotation; and
        an input yoke extending from said rear axle assembly and disposed about a second axis of rotation, said first axis of rotation parallel to said second axis of rotation
    wherein said forward pinion gear is offset from said forward ring gear by a first predetermined distance and said rear pinion gear is offset from said rear ring gear by a second predetermined distance, said second predetermined distance greater than zero, but less than said first predetermined distance.

12. The tandem axle assembly of claim 11 wherein said forward ring gear, said forward pinion gear, said rear ring gear, and said rear pinion gear comprise hypoid gears.

13. The tandem axle assembly of claim 11 wherein said first predetermined distance is between about thirty-one millimeters and about forty-six millimeters.

14. The tandem axle assembly of claim 13 wherein said first predetermined distance is about forty-six millimeters.

15. The tandem axle assembly of claim 11 wherein said second predetermined distance is between about zero millimeters and about twenty-five millimeters.

* * * * *